United States Patent
Schumann (10) Patent No.: US 9,892,502 B2
(45) Date of Patent: Feb. 13, 2018

(54) IMAGE INSPECTION METHOD WITH A PLURALITY OF CAMERAS

(71) Applicant: HEIDELBERGER DRUCKMASCHINEN AG, Heidelberg (DE)

(72) Inventor: Frank Schumann, Heidelberg (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 15/447,888

(22) Filed: Mar. 2, 2017

(65) Prior Publication Data
US 2017/0256047 A1 Sep. 7, 2017

(30) Foreign Application Priority Data
Mar. 2, 2016 (DE) .................. 10 2016 203 392

(51) Int. Cl.
*G06T 7/00* (2017.01)
*G06T 7/13* (2017.01)
(Continued)

(52) U.S. Cl.
CPC .............. *G06T 7/0004* (2013.01); *B41F 7/02* (2013.01); *G06K 9/209* (2013.01); *G06K 9/342* (2013.01);
(Continued)

(58) Field of Classification Search
CPC combination set(s) only.
See application file for complete search history.

(56) References Cited

U.S. PATENT DOCUMENTS

| 4,797,942 A * | 1/1989 | Burt .......................... G06T 3/40 348/218.1 |
| 6,263,100 B1 | 7/2001 | Oshino et al. |

(Continued)

FOREIGN PATENT DOCUMENTS

| DE | 3639636 A1 | 5/1988 |
| DE | 10110994 A1 | 3/2002 |

(Continued)

*Primary Examiner* — Tsung-Yin Tsai
(74) *Attorney, Agent, or Firm* — Laurence A. Greenberg; Werner H. Stemer; Ralph E. Locher (57) ABSTRACT

A digital image inspection method checks printing material processing machine products by recording digital printed partial images using recording devices and combining partial images in an image processing computer forming a digital overall image causing abutment edges at an overlap. The computer inspects the digital overall image and transmits a result to a machine control computer. The computer creates a new image, only containing detected edges, using edge detection methods after combining partial images forming a digital overall image. The computer uses known positions of abutment edges of recording devices to create a further new image only containing regions with abutment edges of recording devices. The computer overlays the new images, providing a resultant image containing only edges along abutment edges of recording devices. The computer applies the resultant image to the digital overall image, defining masking zones in the resultant digital overall image not being checked by image inspection.

7 Claims, 8 Drawing Sheets

(51) Int. Cl.
  *G06T 11/60* (2006.01)
  *H04N 9/09* (2006.01)
  *G06K 9/20* (2006.01)
  *G06K 9/34* (2006.01)
  *G06K 15/02* (2006.01)
  *B41F 7/02* (2006.01)

(52) U.S. Cl.
  CPC ............ *G06K 15/02* (2013.01); *G06T 7/13* (2017.01); *G06T 11/60* (2013.01); *H04N 9/09* (2013.01); *G06T 2207/10004* (2013.01); *G06T 2207/10024* (2013.01); *G06T 2207/20221* (2013.01); *G06T 2207/30144* (2013.01)

(56) References Cited

U.S. PATENT DOCUMENTS

| | | | |
|---|---|---|---|
| 6,628,820 B2 | 9/2003 | Oshino et al. | |
| 6,850,350 B2 | 2/2005 | Kawabata et al. | |
| 8,179,436 B2 | 5/2012 | Sorgius | |
| 9,778,141 B2 * | 10/2017 | Bancalari | G01M 15/02 |
| 2008/0002874 A1 * | 1/2008 | Fiekowsky | G03F 1/84 382/144 |
| 2008/0013822 A1 * | 1/2008 | Pai | G01N 21/9501 382/145 |
| 2009/0324128 A1 | 12/2009 | Kube et al. | |
| 2012/0154594 A1 * | 6/2012 | Xie | G01B 11/245 348/159 |
| 2014/0168420 A1 * | 6/2014 | Naderhirn | G01M 5/0016 348/128 |
| 2014/0247300 A1 * | 9/2014 | Ratjen | B41J 2/2135 347/15 |

FOREIGN PATENT DOCUMENTS

| | | |
|---|---|---|
| DE | 69529548 T2 | 11/2003 |
| DE | 60302183 T2 | 8/2006 |
| DE | 102006039389 A1 | 2/2008 |
| DE | 102006036845 A1 | 3/2008 |

\* cited by examiner

IMAGE INSPECTION METHOD WITH A PLURALITY OF CAMERAS

CROSS-REFERENCE TO RELATED APPLICATION

This application claims the priority, under 35 U.S.C. § 119, of German Application DE 10 2016 203 392.1, filed Mar. 2, 2016; the prior application is herewith incorporated by reference in its entirety.

BACKGROUND OF THE INVENTION

Field of the Invention

The present invention relates to a digital image inspection method with a plurality of cameras.

The invention lies in the technical field of automated quality control of printed products.

The practice of subjecting produced printed products to an automated quality control has been known for a relatively long time in the printing industry. To that end, camera systems are usually used which include one or more digital cameras for capturing the produced printed products from an imaging point of view. In that case, the digital cameras may be attached both within the printing machine, advantageously after the last printing unit, and outside of the printing machine on the delivery. In that case, systems with internally attached digital cameras are usually components of the printing machine itself, whereas image inspection systems with digital cameras applied outside of the printing machine are usually external and independently operating systems which, however, need to be synchronized with the operation of the printing machine and supply feedback about the inspection result thereof to the printer or the controller of the printing machine in each case.

The printed images of the printed products are scanned in by way of the digital camera system and forwarded to a connected image processing computer. Then, the recorded digital printed images are examined with respect to possible printing errors in the image processing computer. In that case, there are various options for implementing that examination. The most common option lies in comparing the recorded printed images with an ideal, digital intended image. That comparison works by way of a threshold calculation. In that case, an examination is carried out as to whether or not the image values of the recorded image deviate from the intended values of the ideal, digital comparison image by more than a threshold or tolerance value determined in advance.

The ideal, digital intended image may be generated in a number of ways in that case. One variant resides in the generation from the prepress data, i.e. from the digitally available print order data. Furthermore, the method of learning or scanning the intended image is also very prevalent. In this case, the printed image to be examined is printed multiple times in the machine and scanned by the digital cameras of the image inspection system. The system then forms an averaged, quasi-ideal intended printed image from the various digital printed images.

The advantage of that method over that of the generation from the prepress data is that the intended printed image thus generated is substantially closer to a printed image which is as ideal as possible and is realistically able to be produced by using the employed printing machine than the digitally generated ideal intended printed image from the prepress data.

If the comparison between the digital printed image recorded by the camera system and the digital intended printed image yields deviations which lie beyond the tolerance values, the corresponding regions of the printed image exhibiting such a deviation are transmitted from the image processing computer to the control computer of the printing machine and are shown to a print worker as a printing error by way of a screen.

If the camera system in that case includes a plurality of digital cameras, providing the advantage of enabling a more exact examination of the printed image, that results in various further consequences for the mode of operation of the image inspection system. Each digital camera only scans part of the printed image to be examined. Then, in the image processing computer, the partial images thus generated may be compared separately to a corresponding ideal partial intended printed image or the partial images are combined to form a digital overall printed image and then compared to the overall ideal intended printed image. Which procedure is more expedient depends, inter alia, on the hardware of the image inspection system and the algorithms of the image comparison itself also have a very large influence thereon. In most cases, the composition to form a digital overall image and the comparison thereof with an ideal overall intended printed image is more efficient.

However, that procedure requires the individual partial images to be combined extremely accurately to form a digital overall image. Otherwise, image artifacts arise at the abutment edges of the partial cameras, i.e. in the overlap regions between the individual partial images. However, there is yet a further problem when combining the partial images of the cameras. Electronic line scan cameras are often used for image capture for that type of image inspection. In that case, such a camera is formed of three individual cameras, each one of which respectively captures a partial image of R, G and B in each case in a line-by-line and spatially separated manner. The three-line-shaped RGB partial images thus generated are then combined to form an overall image. In that respect, two methods are known from the prior art: the method with a trilinear line and the method with three CCD lines with a prism.

Since the individually recorded lines are recorded while being disposed with spatial separation in the line scan camera, the three individual cameras need to be aligned in a mechanically exact manner in order to avoid color fringes in the image. However, that mechanical alignment is often not accurate enough to completely avoid color fringes due to capping costs within the scope of manufacturing. The chromatic aberration of the optics in the line scan cameras also contributes to the color fringes as well.

German translation of European Patent DE 603 02 183 T2, corresponding to U.S. Pat. No. 6,850,350, has in that respect disclosed an optical scanning device with a compact f-theta lens for the effective correction of chromatic aberration.

German translation of European Patent DE 695 29 548 T2, corresponding to U.S. Pat. Nos. 6,263,100 and 6,628, 820, has moreover disclosed an image processing method and device for generating an image from the point of view of an observer on the basis of images obtained from a multiplicity of points of view, through the use of which it is likewise possible to correct the chromatic aberration of optical lenses for the image recording by a CCD sensor.

However, that prior art is not suitable for compensating the problem of color fringes as a result of the inaccurate mechanical alignment of the three individual cameras. Therefore, when using such line scan cameras within the scope of image inspection, the deviation of the digital printed image recorded by the camera from the actually present printed image must be taken into account accordingly within the scope of the evaluation by using the image inspection system. That is normally not a problem if the digital intended printed image, which is compared to the actually recorded digital printed image, is generated by learning or scanning.

However, if a plurality of cameras is used, color fringes which are individual in each case arise in all of the partial images. Since the mechanical alignment of the three individual cameras in the various line scan cameras deviates to a different extent, different color fringes emerge for the partial images recorded by the various cameras. A consequence thereof is that the same areas in the printed image which were recorded by different cameras have different color values due to the color fringes.

Then, as a result of the different color values caused by the different color fringes, a hard color change, which presents itself in the form of an edge, arises at the abutment edges of the line scan cameras where the individual partial images are combined to form a digital overall image. The image processing identifies those edges as an image aberration when comparing the recorded overall image thus combined with the digital intended printed image. However, in reality, they are not real image aberrations, but only a so-called pseudo-aberration which is caused by the non-ideal line scan cameras.

In the previous prior art, the image inspection system is unable to identify such types of pseudo-aberrations in an automated manner. They have to be identified, classified as such and indicated to the inspection system by the print worker. That causes a significant work outlay for the print worker who cannot attend to other necessary activities within the scope of print monitoring during that time.

SUMMARY OF THE INVENTION

It is accordingly an object of the invention to provide a digital image inspection method with a plurality of cameras, which overcomes the hereinafore-mentioned disadvantages of the heretofore-known methods of this general type, which operates more efficiently and which requires fewer manual interventions by a print worker than the previous methods known from the prior art.

With the foregoing and other objects in view there is provided, in accordance with the invention, a digital image inspection method for checking, by way of an image processing computer, products of a machine which processes printing material, wherein digital partial images of the printed image to be inspected are recorded by using a plurality of image recording devices. These digital partial images are combined in the image processing computer to form a digital overall image, as a result of which abutment edges arise in the overlap region of the partial images. The image processing computer then subjects this digital overall image to an image inspection and transmits the result of this image inspection to a control computer of the machine which processes printing material. The image processing computer creates a new image by using edge detection methods after combining the digital partial images to form a digital overall image, the new image only containing the detected edges. The image processing computer furthermore creates a further new image by using the known position of the abutment edges of the image recording devices, the further new image only containing the regions with the abutment edges of the image recording devices. The image processing computer then overlays the two newly created images, as a result of which a resultant image arises, which only contains edges along the abutment edges of the image recording devices. The image processing computer applies this resultant image to the digital overall image and, using this, defines masking zones in the resultant digital overall image which are not checked by the image inspection.

The core of the method according to the invention resides in excluding some of the pseudo-aberrations which have arisen from the image inspection. In order to ensure that the image inspection does not exclude areas which are too large and therefore ensure that the quality of the image inspection overall does not suffer, it is necessary to find out which of these pseudo-aberrations are the most serious. Then, only these most serious pseudo-aberrations need to be excluded from the inspection. The pseudo-aberrations caused by the color fringes are particularly prominent, in particular, where normal edges already occur in the printed image. That is to say, the most serious pseudo-aberrations occur at the interfaces between the hard color fringes along the abutment edges of the cameras and the edges in the actual printed image. In order to ascertain these positions, a new image, which only contains the image locations with edges, is created from the digital intended printed image by using an edge detection method. Thereupon, a second image, which only contains the abutment edges of the cameras, is created. These two images are superposed to form a new resultant image which only still contains the regions of intersection between the abutment edges of the cameras and the image edges themselves. The digital intended printed image is overlaid on this resultant image, with the ascertained regions of intersection then defining the image positions in the original intended printed image which should be masked from the image inspection. Hence, using this method, the most serious pseudo-aberrations are excluded from the image inspection, without the entire overlap region between the individual partial images being removed from the inspection at the same time. Hence, the pseudo-aberrations are reduced and the quality of the image inspection overall is increased, without impairing the inspection quality as a result of masking zones which are too large.

Advantageous, and therefore preferred, developments of the method emerge from the associated dependent claims, and from the description with the associated drawings.

In accordance with a preferred development of the method according to the invention, the image recording devices are color line scan cameras with trilinear lines or color line scan cameras with three CCD lines. In this case, color line scan cameras either with trilinear lines or three CCD line technology were found to be preferred image recording devices.

In accordance with another preferred development of the method according to the invention, the color line scan cameras are disposed in the machine which processes printing material. This is the case because the image inspection is then most efficient if the cameras of the image inspection system are disposed in the printing machine.

In accordance with a further preferred development of the method according to the invention, two digital partial images are recorded by two color line scan cameras which are disposed horizontally next to one another. For most machines which process printing materials, it is entirely sufficient if use is made of two digital cameras which are then disposed next one another in the printing machine, usually after the last printing unit.

In accordance with an added preferred development of the method according to the invention, the masking zones make up no more than 0.1% of the overall area of the digital overall image to be inspected. So as not to qualitatively impair the image inspection too much, the masking zones defined by the method according to the invention must not make up more than at most 0.1% of the overall area of the digital overall image to be inspected. Empirically, this value is entirely sufficient to mask practically all relevant pseudo-aberrations which are caused by color fringes. However, if such pseudo-aberrations should continue to occur in increased numbers, it is also conceivable to use a value greater than 0.1%. This lies within the responsibility of the respective print worker and, configuration-wise, should be facilitated with restrictions by the controller of the image inspection system.

In accordance with an additional preferred development of the method according to the invention, the two newly created images, which respectively contain the detected edges and abutment edges, represent binary image masks, and a resultant binary image mask arises by overlaying the two images, the binary image mask only containing the masking zones, and this binary image mask is applied directly to the digital overall image. The two newly created images, or the image resulting from the overlay of the two images which are created by edge detection methods, are preferably available in the form of a binary image mask. That is to say, the ascertained regions are represented by white/one and the masked regions are represented by black/zero. As a result of the superposition of the two binary image masks, a resultant binary image mask arises, which then only still contains the masking zones with white/one. Naturally, an inverted representation between white/one and black/zero is also conceivable. This resultant binary image mask may then be applied very easily to the digital intended printed image, as a result of which the image regions within the masking zones are, as it were, removed for the image inspection method.

In accordance with a concomitant preferred development of the method according to the invention, the machine which processes printing materials is a sheet-fed offset printing machine. In this case, the digital image inspection method according to the invention is preferably applied in a sheet-fed offset printing machine. However, it is not only applicable in the case of sheet-fed offset printing machines, but may also be applied to all other types of machines which process printing materials. An application going beyond printing technology is also possible, for all image inspection methods operating with a plurality of cameras.

Other features which are considered as characteristic for the invention are set forth in the appended claims.

Although the invention is illustrated and described herein as embodied in an image inspection method with a plurality of cameras, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 8:
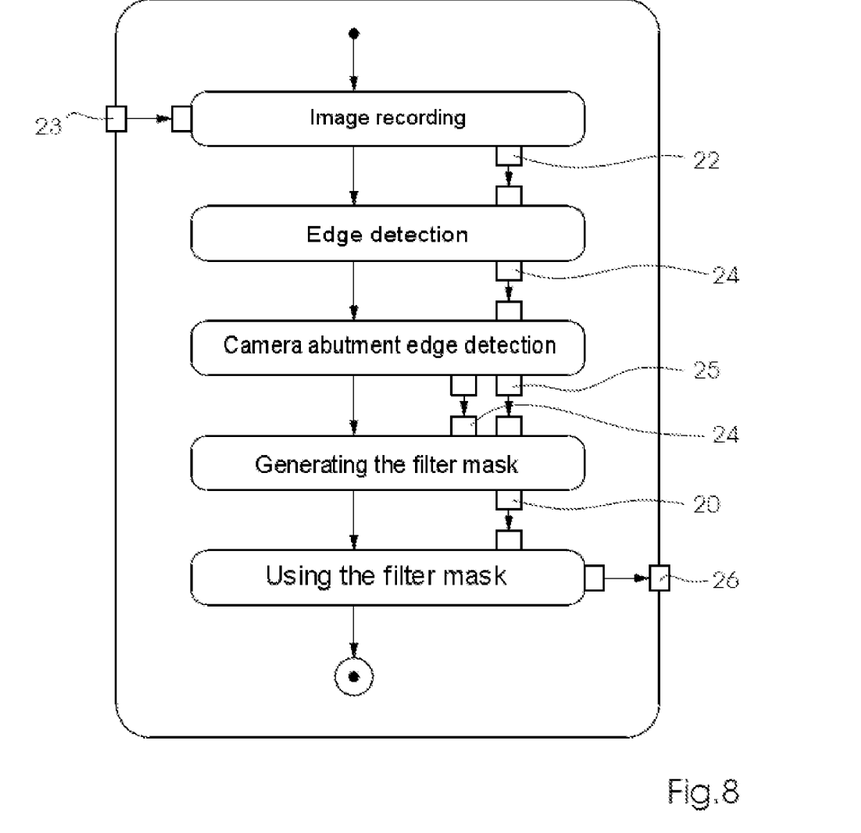
FIG. 8 is a flow chart illustrating the method according to the invention.
Figure 9:
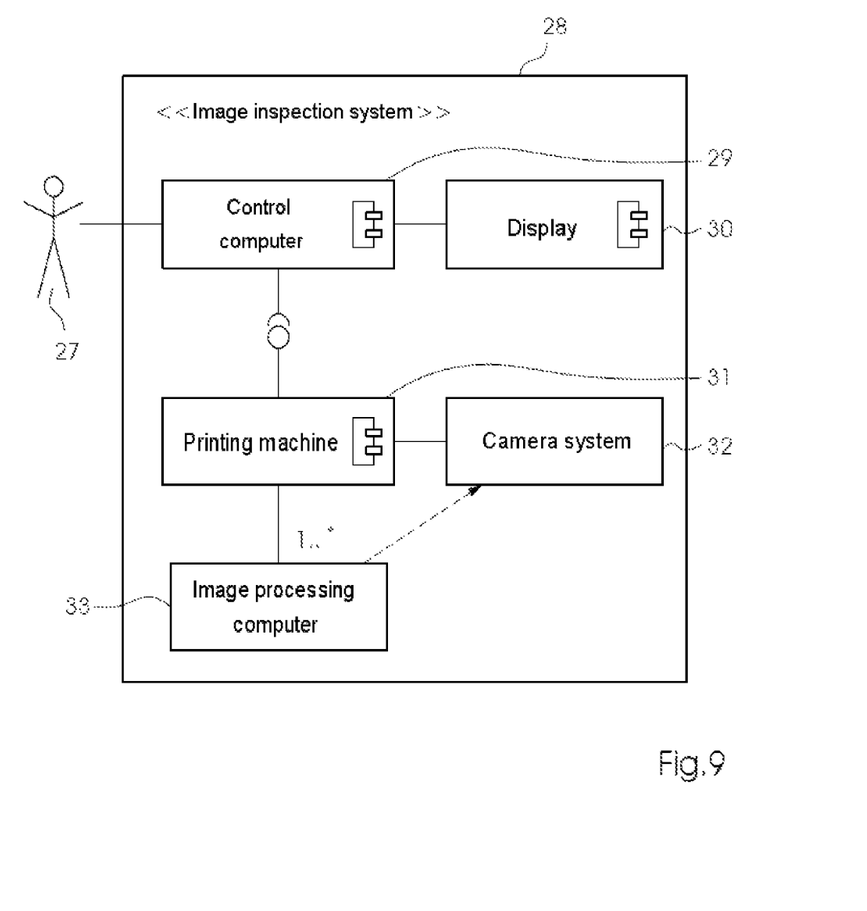
FIG. 9 is a block diagram showing the image inspection system being employed.
Figure 10:
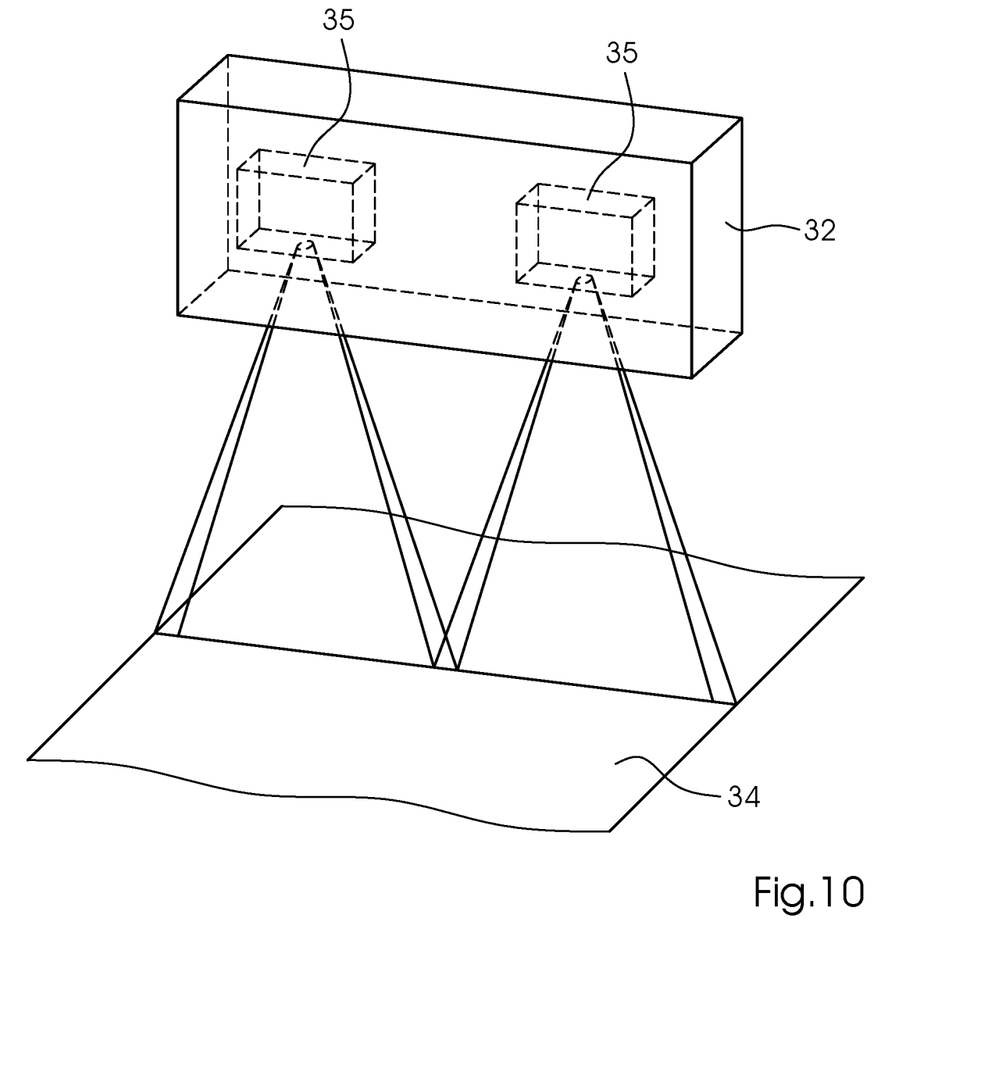
FIG. 10 is a perspective view showing the configuration of the employed camera system with two cameras.

Referring now to the figures of the drawings in detail and first, particularly, to FIG. 8 thereof, there is seen a diagrammatic illustration of the procedure of the method according to the invention. A printing job is started with print order data, and a camera system 32 of an image inspection system 28 records an image during ongoing printing. In this case, the image inspection system 28 is depicted diagrammatically in FIG. 9. In addition to a printing machine 31 itself, the image inspection system 28 includes the camera system 32 applied in the printing machine 31 and an image processing computer 33, which is directly connected to the camera system 32 and is connected to a control computer 29 of the printing machine 31. A display 30 of the control computer 29 constitutes an interface to a user 27. The camera system 32 itself is once again depicted diagrammatically in FIG. 10. The camera system 32 is attached in the interior of the printing machine 31, usually behind the last printing unit, and is formed of two digital cameras 35 in the form of electronic line scan cameras 35 which are disposed horizontally next to one another. In this case, the two partial cameras 35 each record part of a printed image 34, in this case approximately half of the printed image, to be inspected. There is a small overlap region, approximately in the center of the printed image 34, which needs to be taken into account when combining the two partial images. A digital overall image 22 of the printing region 34 now arises by recording an image of the printed, original image from a print order 23. The digital overall image is then compared with the digital intended printed image within the scope of the further image inspection.

Figure 1:
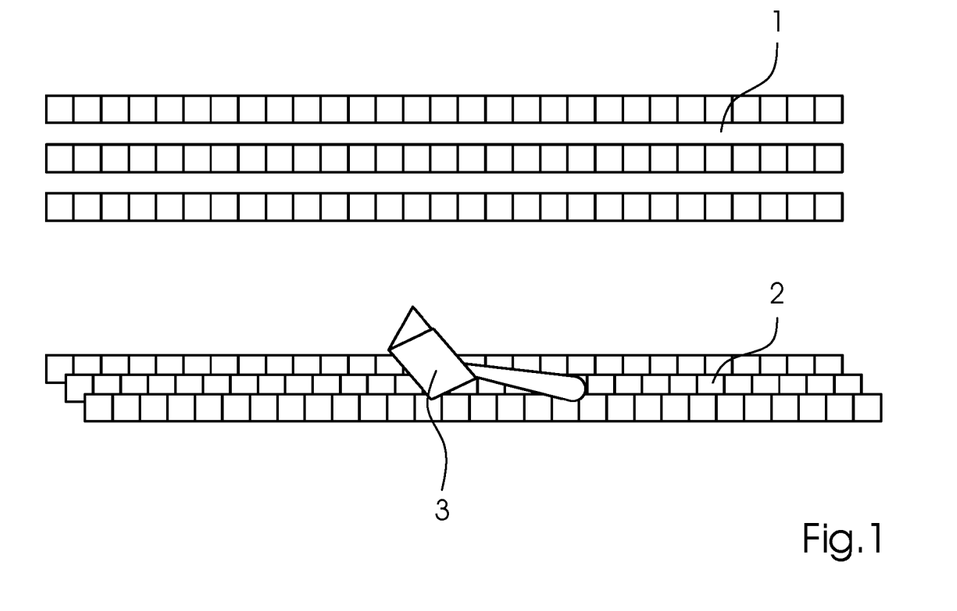
FIG. 1 is a diagrammatic illustration of a trilinear line and a three CCD line with a prism to show the recording principle of an electronic line scan camera.
Figure 2:
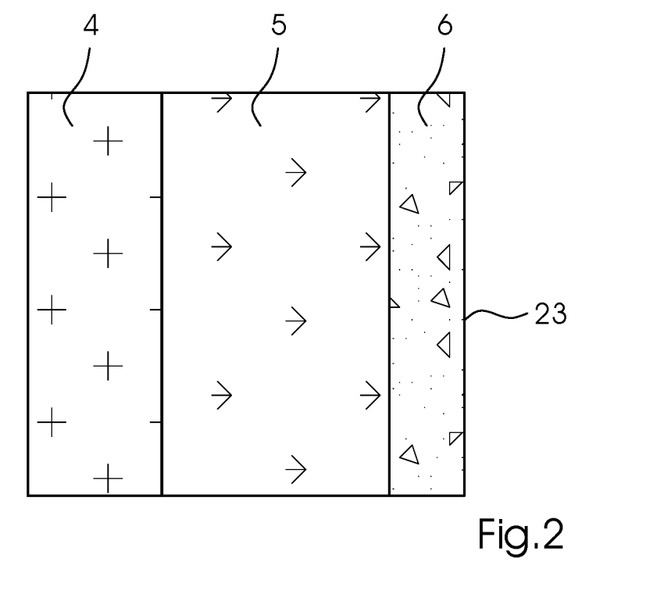
FIG. 2 is a plan view showing an example of a digital intended printed image.
Figure 3:
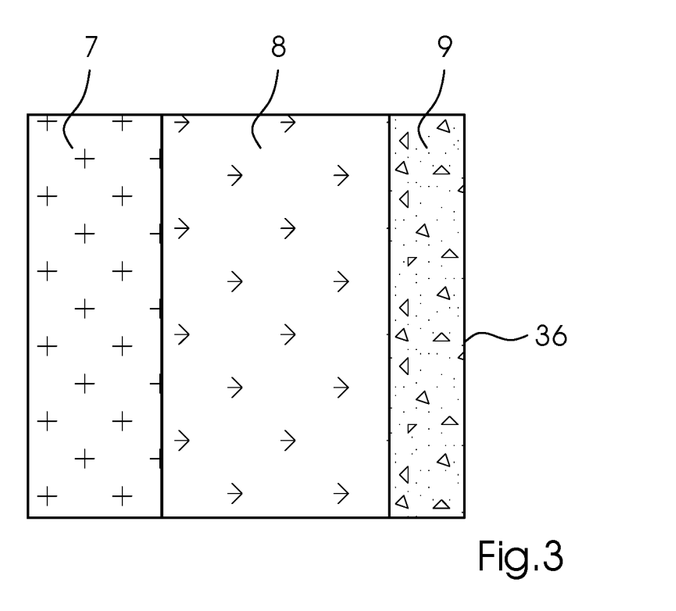
FIG. 3 is a plan view showing the digital intended printed image with color fringes.
Figure 4:
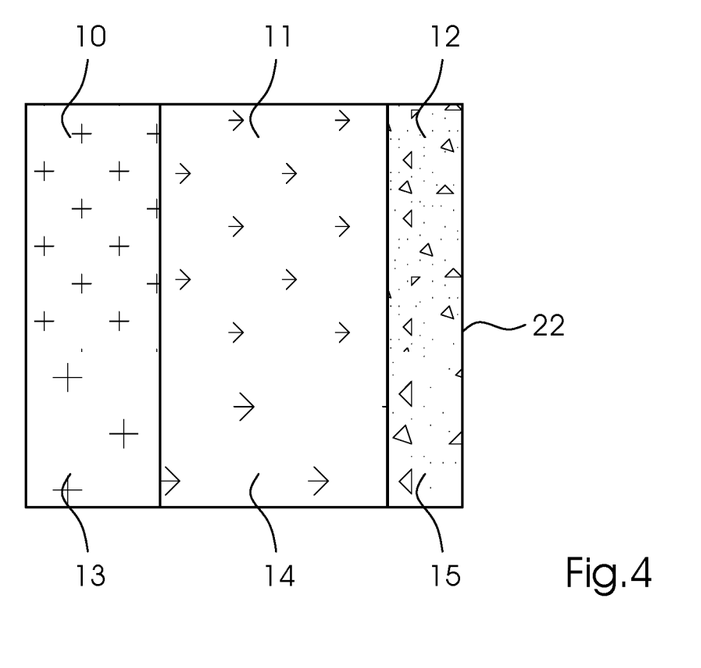
FIG. 4 is a plan view showing a combined inspection image with two different color fringes.
Figure 5:
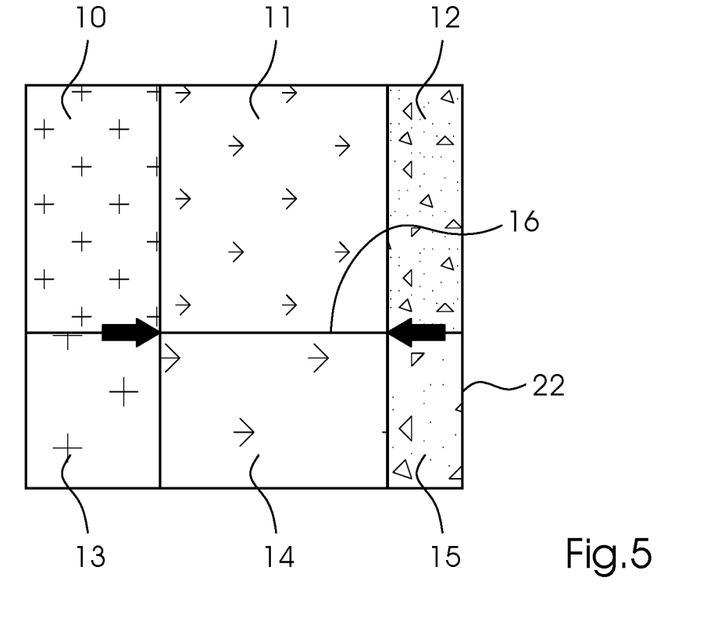
FIG. 5 is a plan view showing a combined image with two different color fringes and pseudo-aberrations.

FIG. 1 depicts an example of such a digital partial camera 35 in the form of an electronic line scan camera 35. In this case, there are two embodiments of an electronic line scan camera 35, with a trilinear line 1 or with a three CCD line 2 with a prism 3. FIG. 2 furthermore depicts an ideal inspection image with a dark line 5 on a lighter background 4, 6. In this case, FIG. 3 shows the same image of a dark line 8 on a lighter background 7, 9 in a real embodiment with color fringes. These cause deviating color values. Since the image inspection system 28 is formed of two partial cameras 35, the overall image 22 initially needs to be combined from the two partial images. In this case, FIG. 4 shows the same, already presented, exemplary image 22 with a black line on a lighter background with color fringes, with the two cameras respectively recording partial images and the latter then being combined in the image processing computer. In this case, it is possible to identify that the color fringes in the two partial images are pronounced to a different extent in dark regions 11, 14 and in light regions 10, 12, 13, 15. This leads to the already described pseudo-aberrations, which are depicted once again in FIG. 5 of the already presented exemplary image. In this case, the abrupt transition of the color values at an abutment edge 16 of the two partial cameras can be seen very well.

Figure 6:
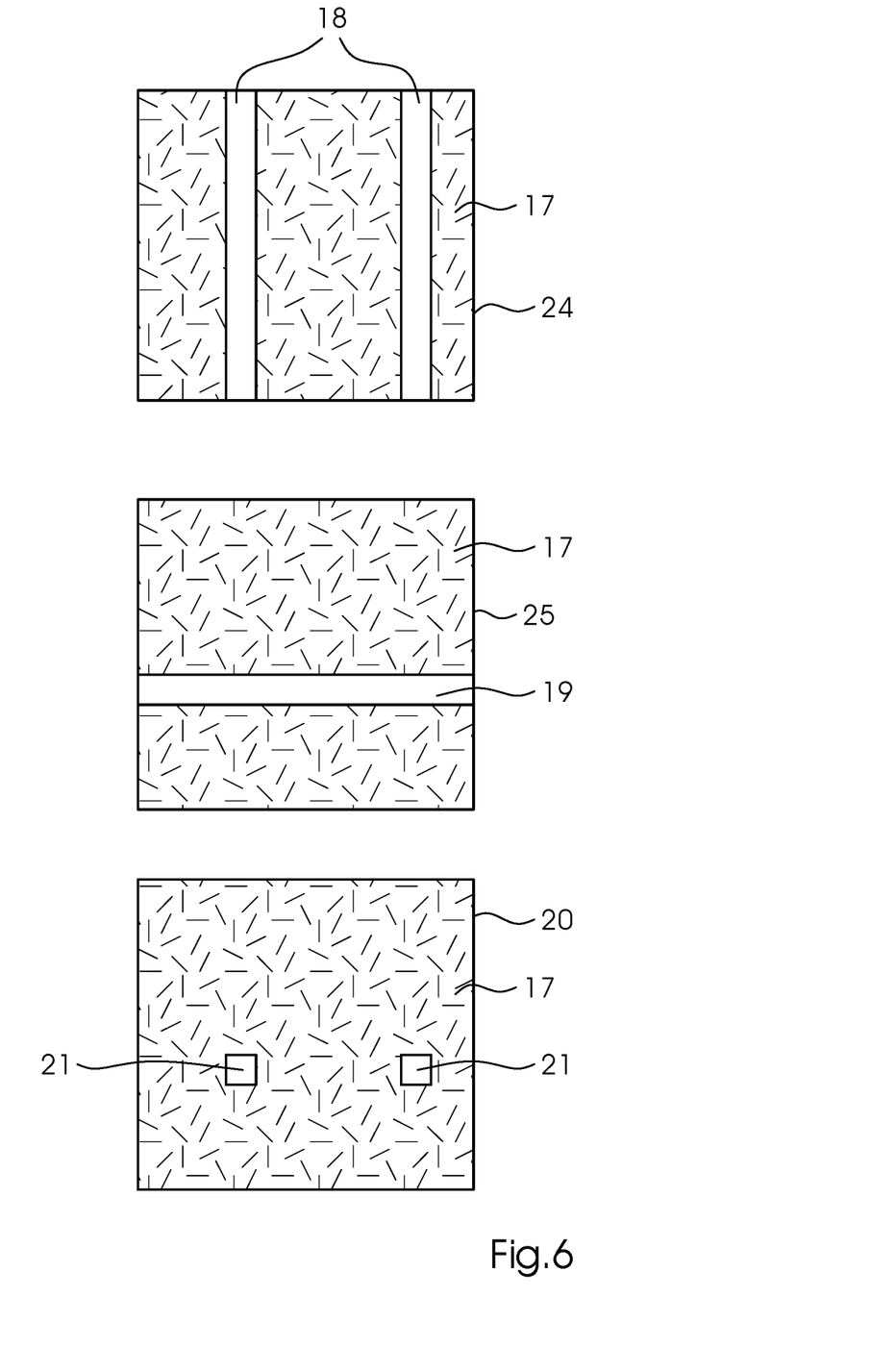
FIG. 6 is a plan view showing three binary image masks.

Masking zones 21 are then ascertained after the image recording within the scope of the method according to the invention. The masking zones are intended to prevent the pseudo-aberrations which have arisen from being included in the inspection result of the image inspection system 28. This is carried out by edge detection methods which are applied to the combined inspection overall image 22. The edge detection method generates a binary image mask 24, which marks only those image locations 18 which contain edges in the overall image 22. The remaining regions 17 of the image mask 24 are masked. Such an image mask 24 is, inter alia, depicted in the first image in FIG. 6. In the next method step, the edge detection methods are then applied to the abutment edges 16 of the partial cameras of the employed overall image 22. In this case, a binary image mask 25 which only contains the abutment edges 16 of the cameras 35 as image regions 19 is created by using the known position of the abutment edges 16 of the cameras 35, i.e. the known overlap regions between the two partial images. The remaining regions 17 are also masked in this case. This is depicted in an exemplary manner in the second image of FIG. 6. These two binary image masks 24, 25 are then superposed in a further method step, as a result of which a resultant binary image mask 20 is obtained. The latter is depicted in an exemplary manner in the third image of FIG. 6. The resultant binary image mask 20 masks all image regions 17, except for the masking zones 21 which are thus defined.

Figure 7:
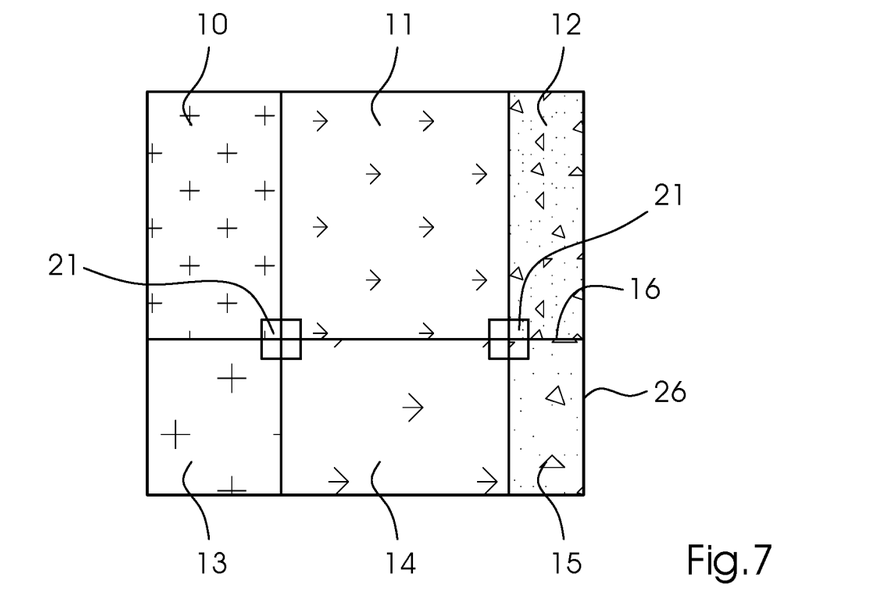
FIG. 7 is a plan view showing the original digital intended printed image with marked masking zones.

In the last method step according to the invention, the resultant binary image mask 20 is then applied to the combined and recorded digital printed image 22 to be inspected. Hence, the masking zones 21 which should not be captured by the inspection method are defined in this digital image 22. FIG. 7 shows an exemplary image 26, already used, with a dark line on a lighter background with the marked masking zones 21. The digital image 26 which is thus obtained is then used for the actual image inspection. This successfully prevents the pseudo-aberrations caused by the color fringes of the individual partial images from having a negative influence on the image inspection method.

The following is a summary list of reference numerals and the corresponding structure used in the above description of the invention:

1 Color line scan camera with trilinear lines
2 Color line scan camera with 3 CCD lines with prism
3 Prism
4 First light area of the exemplary image
5 Dark area of the exemplary image
6 Second light area of the exemplary image
7 First light area of the exemplary image with color fringe
8 Dark area of the exemplary image with color fringe
9 Second light area of the exemplary image with color fringe
10 First light area of the exemplary image from the first camera, with color fringe
11 Dark area of the exemplary image from the first camera, with color fringe
12 Second light area of the exemplary image from the first camera, with color fringe
13 First light area of the exemplary image from the second camera, with color fringe
14 Dark area of the exemplary image from the second camera, with color fringe
15 Second light area of the exemplary image from the second camera, with color fringe
16 Abutment edge of the two partial cameras
17 Masked regions in the image mask
18 Binary image data of the image edge regions
19 Binary image data of the abutment edge regions
20 Resultant binary image mask
21 Masking zones
22 Exemplary image combined from partial images, with color fringes
23 Original exemplary image from print order data
24 Binary image mask with image edge regions
25 Binary image mask with abutment edge regions
26 Exemplary image combined from partial images, with color fringes and masking zones
27 User
28 Image inspection system
29 Control computer of the printing machine
30 Display
31 Printing machine
32 Camera system
33 Image processing computer
34 Printed print substrate
35 Digital line scan camera
36 Exemplary image with color fringes

The invention claimed is:

1. A digital image inspection method using an image processing computer to check products of a printing material processing machine, the method comprising the following steps:

using a plurality of image recording devices to record digital partial images of a printed image to be inspected;
combining the digital partial images in the image processing computer to form a digital overall image, resulting in abutment edges arising in an overlap region of the partial images;
using the image processing computer to then subject the digital overall image to an image inspection and to transmit a result of the image inspection to a control computer of the printing material processing machine;
using the image processing computer to create a new image by using edge detection methods after combining the digital partial images to form the digital overall image, the new image containing only detected edges;
using the image processing computer to create a further new image by using a known position of the abutment edges of the image recording devices, the further new image containing only regions with the abutment edges of the image recording devices;
using the image processing computer to then overlay the new image and the further new image, resulting in a resultant image only containing edges along the abutment edges of the image recording devices; and
using the image processing computer to apply the resultant image to the digital overall image to define masking zones in the resultant digital overall image not being checked by the image inspection.

2. The digital image inspection method according to claim 1, wherein the image recording devices are color line scan cameras with trilinear lines or color line scan cameras with 3 CCD lines.

3. The digital image inspection method according to claim 2, wherein the color line scan cameras are disposed in the printing material processing machine.

4. The digital image inspection method according to claim 2, which further comprises recording two digital partial images by using two color line scan cameras disposed horizontally next to one another.

5. The digital image inspection method according to claim 1, wherein the masking zones make up no more than 0.1 percent of an overall area of the digital overall image to be inspected.

6. The digital image inspection method according to claim 1, wherein:
- the new image and the further new image, respectively containing the detected edges and the abutment edges, represent binary image masks;
- a resultant binary image mask arises by overlaying the new image and the further new image;
- the binary image mask only contains the masking zones; and
- the binary image mask is applied directly to the digital overall image.

7. The digital image inspection method according to claim 1, wherein the printing material processing machine is a sheet-fed offset printing machine.

* * * * *